(12) United States Patent
Green

(10) Patent No.: US 6,239,212 B1
(45) Date of Patent: May 29, 2001

(54) CLEARCOAT COMPOSITION AND METHOD FOR INTERCOAT ADHESION

(75) Inventor: Marvin L. Green, Brighton, MI (US)

(73) Assignee: BASF Corporation., Southfield, MI (US)

( * ) Notice: Subject to any disclaimer, the term of this patent is extended or adjusted under 35 U.S.C. 154(b) by 0 days.

(21) Appl. No.: 09/178,025

(22) Filed: Oct. 23, 1998

(51) Int. Cl.7 .............................. C08J 3/00; C08K 3/20; C08L 75/00; C08L 83/00; C08G 77/04
(52) U.S. Cl. ..................... 524/589; 524/588; 524/590; 524/838; 525/101; 525/487; 528/28
(58) Field of Search ..................... 524/588, 589, 524/590, 838; 525/487, 101; 528/28

(56) References Cited

U.S. PATENT DOCUMENTS

| | | |
|---|---|---|
| 4,613,641 | 9/1986 | Haubennestel et al. . |
| 4,636,552 | 1/1987 | Gay et al. . |
| 4,812,518 | 3/1989 | Hanbennestel et al. . |
| 5,430,083 | 7/1995 | Klier et al. . |
| 5,872,195 * | 2/1999 | Green et al. .......... 525/481 |

* cited by examiner

Primary Examiner—Patrick D. Niland
(74) Attorney, Agent, or Firm—Anne Gerry Sabourin

(57) ABSTRACT

A curable coating composition is described comprising a carbamate functional material, a crosslinking agent and a hydroxyl functional polysiloxane component. Coatings prepared with this coating composition can be cured and coated with additional coating(s), providing good intercoat adhesion to the subsequent coating.

10 Claims, No Drawings

CLEARCOAT COMPOSITION AND METHOD FOR INTERCOAT ADHESION

FIELD OF THE INVENTION

This invention relates to curable coating compositions, comprising a carbmate material, crosslinking agent reactive therewith and a hydroxyl functional polysiloxane component, for use in multilayer coatings.

BACKGROUND OF THE INVENTION

Coating compositions are often divided into thermoplastic and thermoset compositions. Thermoplastic coating compositions utilize high molecular weight polymers dispersed in an organic or aqueous solvent. After the coating composition is applied to a substrate, the solvent is removed and the polymers is set up to form a film. Thermoset or curable coating compositions utilize two components that are reactive with one another under certain cure conditions. The reactive groups on these components are referred to as 'functional groups'. After the composition containing these components is applied, the coated substrate is subjected to cure conditions, causing the functional groups to react and form a cured film of a crosslinked matrix.

Thermoset or curable coating compositions that cure via the formation of urethane bridges in the crosslinked coating are widely used in the art. Urethane bonds are often desirable for their durability, resistance to attack by various agents in the environment, impact resistance, and other physical properties such as stress release. Urethane bridges can be formed by various combinations of functional groups, such as OH functional groups and isocyanate functional groups, carbamate groups and aminoplast resins, or cyclic carbonate groups and amino groups.

In many coating applications, it is often necessary to apply an additional coating on top of an already-cured coating. This may be done to achieve certain visual or physical properties, or it may be necessary to repair areas where the cured coating has been damaged or where coating defects exist. In such cases, it is important that the coating applied on top of the cured coating have adequate adhesion to the cured coating. Sanding the surface generally improves adhesion, but it may not be desirable to sand a surface because of resulting change in the appearance of the sanded surface. Even when the cured coating is sanded prior to application of the additional coating, the adhesion factor is still a concern with regard to overspray areas onto unsanded coating surfaces.

Intercoat adhesion can be of particular concern with regard to coatings that form urethane linkages upon cure, due to the physical and chemical properties of the coating. Intercoat adhesion may be poor due the highly crosslinked nature of the cured film. It has unexpectedly been found that the addition of a polysiloxane compound to a coating composition based on a carbamate-melamine cure system improves intercoat adhesion when compared to a coating of an identical composition without the polysiloxane compound. Additionally, the present invention is directed toward providing curable coating compositions having good intercoat adhesion properties when a cured coated surface is subjected to repair conditions. Repair conditions generally involve application of at least one additional coating followed by application of heat. This result is unexpected, since polysiloxanes which are usually used to improve flow and leveling and to improve mar resistance, generally adhere poorly to subsequent coatings, as described in U.S. Pat. No. 4,812,518.

It is also desirable to promote and/or improve adhesion of basecoat and/or the clearcoat coating compositions to sealant materials, such as where windshield or other sealants are applied to a cured coating. Accordingly, the present invention is also directed toward a cured coating composition having good adhesion to sealant materials.

SUMMARY OF THE INVENTION

The present invention provides a curable coating composition comprising at least:

(A) At least one polymer comprising a plurality of carbamate groups, (B) a component comprising a plurality of groups that are reactive with the carbamate groups on component (A), and (C) a hydroxy functional polysiloxane component having a hydroxyl value of between about 50 and about 170.

Optionally, the coating composition may additionally include hydroxyl functional oligomers or polymers, and carbamate functional oligomers and mixtures thereof. The polysiloxane component may also include a polymeric component such as polester or polyether.

Coatings prepared according to the present invention can be cured and coated with additional coating(s), and have good intercoat adhesion to the additional coating and good adhesion to surface sealants.

The invention also includes a method for improved intercoat adhesion comprising applying to a substrate at least a basecoat layer and a clearcoat layer, followed by application of at least one additional coating layer, wherein at least one layer of the coating composition comprises components (A)–(C). The invention also includes a method for improved adhesion of a cured coating composition to sealant materials.

DESCRIPTION OF THE PREFERRED EMBODIMENTS

The polymer comprising a plurality of carbamate groups that may be used in the practice of the present invention can be prepared in a variety of ways and may comprise materials described in WO 94/10211, U.S. Pat. No. 5,356,669, and U.S. Pat. No. 5,576,063 the disclosures of which are incorporated herein by reference.

One way to prepare such polymers is to prepare an acrylic monomer having a carbamate functionality in the ester portion of the monomer. Such monomers are well-known in the art and are described, for example in U.S. Pat. Nos. 3,479,328, 3,674,838, 4,126,747, 4,279,833, and 4,340,497, the disclosures of which are incorporated herein by reference. One method of synthesis involves reaction of a hydroxy ester with urea to form the carbamyloxy carboxylate (i.e., carbamate-modified acrylic). Another method of synthesis reacts an α,β-unsaturated acid ester with a hydroxy carbamate ester to form the carbamyloxy carboxylate. Yet another technique involves formation of a hydroxyalkyl carbamate by reacting a primary or secondary amine or diamine with a cyclic carbonate such as ethylene carbonate. The hydroxyl group on the hydroxyalkyl carbamate is then esterified by reaction with acrylic or methacrylic acid to form the monomer. Other methods of preparing carbamate-modified acrylic monomers are described in the art, and can be utilized as well. The acrylic monomer can then be polymerized along with other ethylenically-unsaturated monomers, if desired, by techniques well-known in the art.

An alternative route for preparing carbamate-functional polymers is to react an already-formed polymer such as an acrylic polymer with another component to form a carbamate-functional group appended to the polymer backbone, as described in U.S. Pat. No. 4,758,632, the disclosure of which is incorporated herein by reference. One technique for preparing carbamate-functional polymers involves thermally decomposing urea (to give off ammonia and HNCO) in the presence of a hydroxy-functional acrylic polymer to form a carbamate-functional acrylic polymer. Another technique involves reacting the hydroxyl group of a hydroxyalkyl carbamate with the isocyanate group of an isocyanate-functional acrylic or vinyl monomer to form the carbamate-functional acrylic. Isocyanate-functional acrylics are known in the art and are described, for example in U.S. Pat. No. 4,301,257, the disclosure of which is incorporated herein by reference. Isocyanate vinyl monomers are well-known in the art and include unsaturated m-tetramethyl xylene isocyanate (sold by American Cyanamid as TMI®). Yet another technique is to react the cyclic carbonate group on a cyclic carbonate-functional acrylic with ammonia in order to form the carbamate-functional acrylic. Cyclic carbonate-functional acrylic polymers are known in the art and are described, for example, in U.S. Pat. No. 2,979,514, the disclosure of which is incorporated herein by reference. A preferred approach is a transcarbamylation or transesterification reaction of a hydroxy-functional polymer with an alkyl carbamate or hydroxyalkyl carbamate. A more difficult, but feasible way of preparing the polymer would be to transesterify an acrylate polymer with a hydroxyalkyl carbamate.

Other polymers can be used as well. For example, a carbamate-functional polyurethane can be prepared as is described in U.S. patent application Ser. No. 08/098,169, the disclosure of which is incorporated herein by reference. A carbamate-functional polyester can be prepared as described in JP 51/4124, the disclosure of which is incorporated herein by reference.

Carbamate-functional polymers can have a molecular weight of 2000–20,000, and preferably from 4000–6000. Molecular weight as used herein means weight average molecular weight, and can be determined by the GPC method using a polystyrene standard. The carbamate content of the polymer, on a molecular weight per equivalent of carbamate functionality, will generally be between 200 and 1500, and preferably between 300 and 500.

One class of carbamate-functional polymer component can be represented by randomly repeating units according to the following formula:

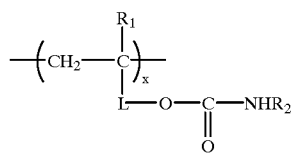

In the above formula, $R_1$ represents H or $CH_3$. $R_2$ represents H, alkyl, preferably of 1 to 6 carbon atoms, or cycloalkyl, preferably up to 6 ring carbon atoms. It is to be understood that the terms alkyl and cycloalkyl are to include substituted alkyl and cycloalkyl, such as halogen-substituted alkyl or cycloalkyl. Substituents that will have an adverse impact on the properties of the cured material, however, are to be avoided. For example, ether linkages are thought to be susceptible to hydrolysis, and should be avoided in locations that would place the ether linkage in the crosslink matrix. The values x and y represent weight percentages, with x being 10 to 90% and preferably 40 to 60%, and y being 90 to 10% and preferably 60 to 40%.

In the above formula, A represents repeat units derived from one or more ethylenically unsaturated monomers. Such monomers for copolymerization with acrylic monomers are known in the art. They include alkyl esters of acrylic or methacrylic acid, e.g., ethyl acrylate, butyl acrylate, 2-ethylhexyl acrylate, butyl methacrylate, isodecyl methacrylate, hydroxyethyl methacrylate, hydroxypropyl acrylate, and the like; and vinyl monomers such as unsaturated m-tetramethyl xylene isocyanate (sold by American Cyanamid as TMI®), styrene, vinyl toluene and the like.

L represents a divalent linking group, preferably an aliphatic of 1 to 8 carbon atoms, cycloaliphatic, or aromatic linking group of 6 to 10 carbon atoms. Examples of L include

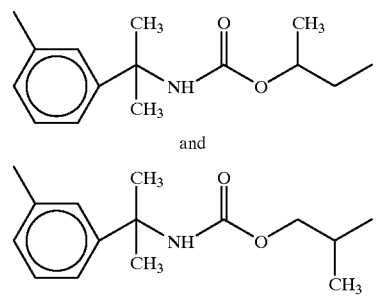

$-(CH_2)-$, $-(CH_2)_2-$, $-(CH_2)_4-$, and the like. In one preferred embodiment, $-L-$ is represented by $-COO-L'-$ where $L'$ is a divalent linking group. Thus, in a preferred embodiment of the invention, the carbamate-functional polymer component is represented by randomly repeating units according to the following formula:

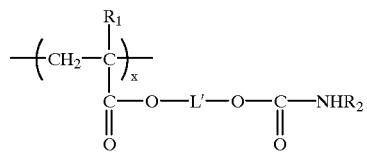

In this formula, $R_1$, $R_2$, A, x, and y are as defined above. $L'$ may be a divalent aliphatic linking group, preferably of 1 to 8 carbon atoms, e.g., $-(CH_2)-$, $-(CH_2)_2-$, $-(CH_2)_4-$, and the like, or a divalent cycloaliphatic linking group, preferably up to 8 carbon atoms, e.g., cyclohexyl, and the like. However, other divalent linking groups can be used, depending on the technique used to prepare the polymer. For example, if a hydroxyalkyl carbamate is adducted onto an isocyanate-functional acrylic polymer, the linking group $L'$ would include an $-NHCOO-$ urethane linkage as a residue of the isocyanate group.

Lower molecular weight carbamate-functional materials, such as oligomeric or non-polymeric materials may also be used in the practice of the present invention. Such compounds can be prepared in a variety of ways.

One way to prepare such carbamate-functional materials is to react an alcohol ('alcohol' is defined herein as having one or more OH groups) with a urea to form a compound with carbamate group(s). This reaction is accomplished by heating a mixture of the alcohol and urea. Another technique is the reaction of a polyol with a monoisocyanate (e.g., methyl isocyanate) to form a compound with multiple secondary carbamate groups or to react an alcohol with cyanic acid to form a compound with primary carbamate groups(s) (i.e., unsubstituted carbamates). This reaction is also performed under heat, preferably in the presence of a catalyst as is known in the art. Carbamates may also be prepared by reaction of an alcohol with phosgene and then ammonia to form a compound having primary carbamate group(s), or by reaction of a polyol with phosgene and then a primary amine to form a compound having secondary carbamate groups. Another approach is to react an isocyanate (e.g., HDI, IPDI) with a compound such as hydroxypropyl carbamate to form a carbamate-capped isocyanate derivative. Finally, carbamates can be prepared by a transcarbamylation approach where an alcohol or hydroxyalkyl carbamate is reacted with an alkyl carbamate (e.g., methyl carbamate, ethyl carbamate, butyl carbamate) to form a primary carbamate group-containing compound. This reaction is performed under heat, preferably in the presence of a catalyst such as an organometallic catalyst (e.g., dibutyltin dilaurate). Other techniques for preparing carbamates are also known in the art and are described, for example, in P. Adams & F. Baron, "Esters of Carbamic Acid", Chemical Review, v. 65, 1965.

Various alcohols can be used in the preparation of carbamate compounds useful in the practice of the invention. They generally have from 1 to 160 carbon atoms, preferably 1–60 carbon atoms, and may be monofunctional or polyfunctional (preferably a functionality of 2 to 3), aliphatic, aromatic, or cycloaliphatic. They may contain just OH groups, or they may contain OH groups plus heteroatoms such as O, S, Si, N, P, and other groups such as ester groups, ether groups, amino groups, or unsaturated sites. Examples of useful alcohols include 1,6-hexanediol, 1,2-hexanediol, 2-ethyl-1,3-hexanediol, ethyl-propyl-1,5-pentanediol, 2-methyl-2,4-pentanediol, 2,2,4-trimethyl-1,3-pentanediol, 2,4,7,9-tetramethyl-5-decyn-4,7-diol, 1,3-dihydroxyacetone dimer, 2-butene-1,4-diol, pantothenol, dimethyltartrate, pentaethylene glycol, dimethyl silyl dipropanol, and 2,2'-thiodiethanol.

Another approach is to react an isocyanate (preferably a diisocyanate, e.g., HDI, IPDI) with a compound such as hydroxypropyl carbamate to form a carbamate-capped polyisocyanate derivative as described in U.S. patent application Ser. No. 08/098,176. The polyisocyanate can be an aliphatic polyisocyanate, including a cycloaliphatic polyisocyanate or an aromatic polyisocyanate. Useful aliphatic polyisocyanates include aliphatic diisocyanates such as ethylene diisocyanate, 1,2-diisocyanatopropane, 1,3-diisocyanatopropane, 1,6-diisocyanatohexane, 1,4-butylene diisocyanate, lysine diisocyanate, 1,4-methylene bis-(cyclohexyl isocyanate) and isophorone diisocyanate. Useful aromatic diisocyanates and aliphatic diisocyanates include the various isomers of toluene diisocyanate, meta-xylenediioscyanate and para-xylenediisocyanate, also 4-chloro-1,3-phenylene diisocyanate, 1,5-tetrahydronaphthalene diisocyanate, 4,4'-dibenzyl diisocyanate and 1,2,4-benzene triisocyanate can be used. In addition, the various isomers of α, α, α', α'-tetramethyl xylene diisocyanate can be used. Biurets of isocyanates such as DESMO-DUR® N-1OO from Mobay may also be useful.

In one embodiment of the invention, a polyisocyanate is reacted with a compound containing an isocyanate-reactive group and a carbamate group, e.g., a hydroxyalkyl carbamate such as hydroxypropyl carbamate or hydroxyethyl carbamate. Alternatively, the polyisocyanate may be adducted with substituents that have the capability of forming carbamate groups after reaction with the polyisocyanate compound is completed. For example, the polyisocyanate can be reacted with a compound having an active hydrogen group (e.g., hydroxyl) and a cyclic carbonate group (e.g., the reaction product of glycidol and $CO_2$), and the cyclic carbonate groups then reacted with ammonia to form the carbamate functional groups. Alternatively, the polyisocyanate can be reacted with an active hydrogen group (e.g., hydroxyl) and an epoxy group, and then with $CO_2$ to convert the epoxy to cyclic carbonate, and the cyclic carbonate groups then reacted with ammonia to form the carbamate functional groups.

Another method of synthesis is to first react the isocyanate groups on a polyisocyanate with a compound having a group that is reactive with isocyanate and also a non-NCO functional group. This adduct is then reacted with a compound comprising at least one carbamate group or group that can be converted to carbamate and at least one group reactive with the non-NCO functional groups. Examples of non-NCO functional groups include carboxyl, epoxy, hydroxyl, amino. For example, an OH-functional adduct (which can be formed by reacting a polyisocyanate with an amino alcohol) can be reacted with the oxygen of a COO portion of the carbamate group or an alkyl carbamate or with the methylol group of methylol acrylamide (HO—$CH_2$—NH—CO—CH=$CH_2$). In the case of the COO group on an alkyl carbamate, the hydroxyl group on the polyurethane undergoes a transesterification with the COO group, resulting in the carbamate group being appended to the polyurethane. In the case of methylol acrylamide, the unsaturated double bond is then reacted with peroxide to form an epoxy group. The epoxy groups are then reacted with $CO_2$ to form cyclic carbonate groups, which are converted to carbamate groups by reaction with ammonia. Alternatively, an acid-functional polyisocyanate (which can be formed by reaction of a polyisocyanate with a hydroxy-functional carboxylic acid) can be reacted with acetic anhydride to generate an anhydride-functional triisocyanurate, which can then be reacted with an hydroxyalkylcarbamate.

The above-described polyisocyanates are adducted with compounds containing a carbamate group or group that can be converted to carbamate and a group that is reactive with the NCO- or non-NCO-functional group on the polyisocyanate. Carbamate-containing compounds that can be adducted onto the NCO groups of a diisocyanate or an isocyanurate are preferably active hydrogen-containing carbamates such as hydroxyalkyl carbamates (e.g., hydroxypropyl carbamate or hydroxyethyl carbamate). Compounds containing groups that can be converted to carbamate and groups that are reactive with NCO include active hydrogen-containing cyclic carbonate compounds convertible to carbamate by reaction with ammonia (e.g., the reaction product of glycidol and $CO_2$), monoglycidyl ethers (e.g., Cardura E®) convertible to carbamate by reaction with $CO_2$ and then ammonia, and monoglycidyl esters (e.g., the reaction product of a carboxylic acid and epichlorohydrin) convertible to carbamate by reaction with $CO_2$ and then ammonia, allyl alcohols where the alcohol group is reactive with NCO and the double bond can be converted to carbamate by reaction with peroxide, and vinyl esters where the ester group is reactive with NCO and the vinyl group can be converted to carbamate by reaction with peroxide, then $CO_2$, and then ammonia.

Non-polymeric or oligomeric carbamate-functional compounds will generally have a molecular weight of 75–2000, and preferably from 75–1500. As used herein, molecular weight means weight average molecular weight. Molecular weight can be determined by the GPC method.

Mixtures of the polymeric and non-polymeric or oligomeric carbamate functional compounds may also be utilized in the coating composition of the present invention.

A number of materials can be used as the crosslinking agent to react with carbamate to form a urethane linkage as defined above. These include aminoplast resins such as melamine formaldehyde resin (including monomeric or polymeric melamine resin and partially or fully alkylated melamine resin), urea resins (e.g., methylol ureas such as urea formaldehyde resin, alkoxy ureas such as butylated urea formaldehyde resin), polyanhydrides (e.g., polysuccinic anhydride), phenol/formaldehyde adducts, and polysiloxanes (e.g., trimethoxy siloxane). Preferred are aminoplast resins where one or more of the amino nitrogens is substituted with a carbamate group for use in a process with a curing temperature below 150° C., as described in U.S. Pat. No. 5,300,328.

Examples of the hydroxyl functional polysiloxane compound utilized in the present invention include alkyl or hydroxy alkyl substituted hydroxy polysiloxane compounds and acrylic, polyurethane, polyester or polyether modified polysiloxane. The hydroxyl functional polysiloxane is used in an amount between 0.005 and 2.0 percent, preferably between 0.05 and 1.0, based on total non-volatile content of the coating composition. The polysiloxane has a hydroxyl value of between 50 and 170. Preferably, the hydroxyl value is at least 70, and more preferably between 80 and 140. Preferably, the polysiloxane is a polyester modified polysiloxane. The polyester modified polysiloxane has a weight average molecular weight between 1000 and 20,000, preferably between 2,000 and 10,000. The polyester modified polysiloxane may be further substituted with alkyl, dialkyl, phenyl, diphenyl, alkyl phenyl groups. Preparation methods for such polyesters are described in U.S. Pate. Nos. 4,636,552, 4,613,641 and 4,812,518.

In a preferred embodiment, the composition of the present invention also comprises a component that includes one or more epoxide groups. Epoxides are well-known in the art. The epoxide may be of the general formula:

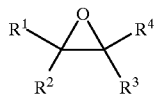

where $R^1$, $R^2$, $R^3$, and $R^4$ are each independently H (with the proviso that at least one of R1–R4 is other than H), an organic radical, which may be polymeric or non-polymeric and may contain unsaturation and/or heteroatoms, or one of R1 or R2 together with one of R3 or R4 may form a cyclic ring, which may contain unsaturation and/or heteroatoms.

Although essentially any epoxide can be used in the practice of the present invention, the epoxide is preferably substantially free of groups that are reactive with either of the two components that are reactive with one another to form urethane linkages. By 'substantially free' of such groups, it is meant that the degree of reaction between either of the two components that are reactive to form urethane linkages and any reactive component on the epoxide is sufficiently low so as to avoid any undesired adverse impact on the intercoat adhesion properties of the coating.

Useful epoxides can be prepared from alcohols, e.g., butanol, trimethylol propane, by reaction with an epihalohydrin (e.g., epichlorohydrin), or by reactio of an allyl group with peroxide. Oligomeric or polymeric polyepoxides, such as acrylic polymers or oligomers containing glycidyl methacrylate or epoxy-terminated polyglycidyl ethers such as the diglycidyl ether of bisphenol A (DGEBPA), can also be used. Epoxidized polyurethane resins or polyester resins can be prepared by reacting OH group-containing polyurethanes or polyesters, as are known in the art, with an epihalohydrin. Epoxides can also be prepared by reacting an isocyanate-terminated component such as a monomeric polyisocyanate or polymer or oligomer with glycidol. Other known polyepoxides, e.g., epoxy-novolacs, may also be used.

In one preferred embodiment, the epoxide is an acrylic-containing polymer or oligomer, preferably deriving its epoxy groups from glycidyl methacrylate monomer, glycidyl acrylate, allyl glycidyl ether, cyclohexyl monoepoxyy methacrylate, the epoxide of the dimer of cylopentadiene methacrylate, or epoxidized butadiene, more preferably glycidyl methacrylate. In another preferred embodiment, both the epoxy-containing component and one of the components that reacts to form urethane linkages are acrylic polymers or oligomers. The epoxide is preferably present in the coating composition in an amount of from 0.0001 to 0.05 equivalents of epoxy per 100 g of resin. Such an epoxy acrylic resin preferably includes one or more of the components lauryl methacrylate, 2-ethylhexyl acrylate, 2-ethylhexyl methacrylate, or butyl acrylate. The epoxy equivalent weight, molecular weight, and glass transition temperature of the epoxy acrylic resin are adjusted by varying the monomer lineup to optimize the performance in the particular coating composition by techniques known in the art.

The coating composition may additionally contain a hydroxy functional polymer, such as hydroxy functional acrylic polymer in an amount between 0.5 and 25.0 percent based on total solids content of the coating composition.

A solvent may optionally be utilized in the coating composition of the present invention. Although the composition according to the present invention may be utilized, for example, in the form of substantially solid powder, or a dispersion, it is often desirable that the composition is in a substantially liquid state, which can be accomplished with the use of a solvent. This solvent should act as a solvent with respect to all of the components in the composition. In general, depending on the solubility characteristics of various components, the solvent can be any organic solvent and/or water. In one preferred embodiment, the solvent is a polar organic solvent. More preferably, the solvent is a polar aliphatic solvents or polar aromatic solvents. Still more preferably, the solvent is a ketone, ester, acetate, aprotic amide, aprotic sulfoxide, or aprotic amine. Examples of useful solvents include methyl ethyl ketone, methyl isobutyl ketone, m-amyl acetate, ethylene glycol butyl ether-acetate, propylene glycol monomethyl ether acetate, xylene, N-methylpyrrolidone, or blends of aromatic hydrocarbons. In another preferred embodiment, the solvent is water or a mixture of water with small amounts of co-solvents.

The coating composition used in the practice of the invention may include a catalyst. The catalyst may be a blocked or unblocked phosphorus containing acid or phosphorus containing acid derivative, having an acid number between 200 and 900. Examples of such catalysts include pyrophosphates, esters of phosphoric acid including, but not limited to phenyl acid phosphate, and alkyl acid phosphates having an alkyl chain of 1 to 8 carbon atoms in length. Other suitable catalysts include sulfonic acids such as, but not limited to, dodecyl benzene sulfonic acid, p-toluenesulfonic acid, dinonylnaphthalene disulfonic acid, and Lewis acids. The catalyst may also comprise mixtures of catalysts.

In a preferred embodiment of the invention, the solvent is present in the coating composition in an amount of from about 0.01 weight percent to about 99 weight percent, preferably from about 10 weight percent to about 60 weight percent, and more preferably from about 30 weight percent to about 50 weight percent.

Any additional agent used, for example, surfactants, fillers, stabilizers, wetting agents, dispersing agents, adhesion promoters, UV absorbers, HALS, etc. may be incorporated into the coating composition. While the agents are well-known in the prior art, the amount used must be controlled to avoid adversely affecting the coating characteristics.

The coating composition of the invention may be clear or it may be a pigmented paint coating. When it is pigmented, the pigment may be any organic or inorganic compounds or colored materials, fillers, metallic or other inorganic flake materials such as mica or aluminum flake, and other materials of kind that the art normally names as pigments. Pigments are usually used in the composition in an amount of 1% to 100%, based on the total solid weight of components in the coating composition (i.e., a pigment:binder ratio of 0.1 to 1).

The coating composition of the present invention provides enhanced intercoat adhesion when the polysiloxane component is used in the basecoat or clearcoat layer.

In a preferred embodiment, the coating composition containing the polysiloxane component according to the invention is used as the clearcoat of a composite color-plus-clear coating. Pigmented basecoat compositions useful therewith include any of a number of types well-known in the art, and does not require explanation in detail herein. Polymers known in the art to be useful in basecoat compositions include acrylics, vinyls, polyurethanes, polycarbonates, polyesters, alkyds, and polysiloxanes. Preferred polymers include acrylics and polyurethanes. In one preferred embodiment of the invention, the basecoat composition also utilizes a carbamate-functional acrylic polymer. Basecoat polymers may be thermoplastic, but are are preferably crosslinkable and comprise one or more type of crosslinkable functional groups. Such groups include, for example, hydroxy, isocyanate, amine, epoxy, acrylate, vinyl, silane, and acetoacetate groups. These groups may be masked or blocked in such a way so that they are unblocked and available for the cross-linking reaction under the desired curing conditions, generally elevated temperatures. Useful cross-linkable functional groups include hydroxy, epoxy, acid, anhydride, silane, and acetoacetate groups. Preferred cross-linkable functional groups include hydroxy functional groups and amino functional groups.

Basecoat polymers may be self-cross-linkable, or may require a separate cross-linking agent that is reactive with the functional groups of the polymer. When the polymer comprises hydroxy functional groups, for example, the cross-linking agent may be an aminoplast resin, isocyanate and blocked isocyanates (including isocyanurates), and acid or anhydride functional cross-linking agents.

Examples of basecoats suitable for use with a clearcoat containing the hydroxyl functional polysiloxane additive according to the present invention include hydroxy functional polymer resin crosslinked with melamine. These are commercially available from BASF Corporation, Southfield, Michigan, under the following codes, E87AE720, a silver metallic high solids solventborne basecoat of an acrylic-melamine formulation; E55NW 028, a beige metallic waterborne basecoat of polyurethane-melamine formulation; E54WW005, a white waterborne basecoat of a polyurethane-melamine formulation.

The coating compositions described herein are preferably subjected to conditions so as to cure the coating layers.

The present invention further comprises a method for improving intercoat adhesion of a multilayer coating composition. The method comprises applying to a substrate, a layer of a basecoat composition, followed by application of a layer of a clearcoat coating composition, wherein at least one of the coating compositions comprises (A) at least one polymer comprising a plurality of carbamate groups, (B) a component comprising a plurality of groups that are reactive with the carbamate groups on component (A), and (C) a hydroxy functional polysiloxane component having a hydroxyl value of between about 50 and about 170.

The substrate to be coated may be primed or unprimed. If unprimed, the substrate may be may be untreated or may be treated, such as by phosphate treatment. The basecoat composition is applied at a thickness of between 0.3 and 1.5 mils, where the preferred range is 0.5 to 1.2 mils. The clearcoat composition is generally applied at a thickness of up to 2.5 mils. The thickness may range from 0 to 2.4 mils, where 0 represents overspray of the clearcoat. Preferably, the clearcoat is applied at a thickness of above 1.2 mils and more preferably from 1.4 to 2.0 mils. Improved intercoat adhesion was found, within these ranges of film thickness, when the clearcoat contained the hydroxy functional polysiloxane componenet.

Coating compositions can be coated on the article by any of a number of techniques well-known in the art. These include, for example, spray coating, dip coating, roll coating, curtain coating, and the like. For automotive body panels, spray coating is preferred.

Although various methods of curing may be used, heat-curing is preferred. Generally, heat curing is effected by exposing the coated article to elevated temperatures provided primarily by radiative heat sources. Curing temperatures will vary depending on the particular blocking groups used in the cross-linking agents, however they generally range between 82° C. and 177° C. The curing time will vary depending on the particular components used, and physical parameters such as the thickness of the layers, however, typical curing times range from 15 to 60 minutes.

The present invention is particularly useful in providing intercoat adhesion in a repair coating situation, where it is necessary to apply additional coatings to a substrate having thereon a cured basecoat and a cured clearcoat layer. The subsequent repair coating composition may be cured at temperatures between 82° C. and 149° C. for between 10 minutes and 90 minutes. Actual examples of repair methods are set forth in the examples.

The invention is further described in the following non-limiting examples.

Clearcoat Preparation

Clearcoat compositions were prepared having the following formulations. Weights are set forth in percent by weight based on total coating composition weight.

coating with a cross-cut pattern and applying and removing pressure-sensitive adhesive tape. The panels were evaluated for percent adhesion over the length of the clearcoat wedge. 100% adhesion indicated that no base/clear was removed during the test. Any panel with less than 90% adhesion was considered a failure.

Overbake Repair

| Ingredient | Control A | Control B | Invention A | Invention B | Invention C | Invention D | Invention E | Invention F |
|---|---|---|---|---|---|---|---|---|
| Carbamate Functional Acrylic Resin | 51.00 | 51.23 | 50.72 | 50.72 | 51.88 | 51.88 | 51.72 | 52.43 |
| Reactive Intermediate | 12.24 | 12.30 | 12.45 | 12.45 | 12.72 | 12.72 | 12.72 | 12.72 |
| Hexamethoxymethyl Melamine | 7.67 | 7.71 | 7.64 | 7.64 | 7.81 | 7.81 | 7.81 | 7.81 |
| Rheological Agent Dispersion, Type I | 3.58 | 3.58 | 3.58 | 3.58 | 3.58 | 3.58 | 3.58 | 3.58 |
| Rheological Agent Dispersion, Type II | 6.89 | 6.89 | 6.89 | 6.89 | 6.89 | 6.89 | 6.89 | 6.89 |
| UVA Solution | 8.56 | 8.56 | 8.56 | 8.56 | 8.56 | 8.56 | 8.56 | 8.56 |
| Tinuvin 400 | 0.54 | 0.54 | 0.54 | 0.54 | 0.54 | 0.54 | 0.54 | 0.54 |
| Tinuvin 123 | 0.82 | 0.82 | 0.82 | 0.82 | 0.82 | 0.82 | 0.82 | 0.82 |
| Polybutyl Acrylate | 0.11 | 0.11 | 0.11 | 0.11 | 0.11 | 0.11 | 0.11 | 0.11 |
| Blocked DDBSA Catalyst | 3.05 | 1.24 | 3.05 | 3.05 | 3.05 | 3.05 | 3.05 | 1.24 |
| Blocked pTSA Catalyst | | 0.98 | | | | | | 0.98 |
| Monofunctional Organic Acid | 0.29 | 0.29 | 0.29 | 0.29 | | | | |
| GMA Acrylic Resin | 1.02 | 1.02 | 1.02 | 1.02 | | | | |
| Polyhydroxycarboxyic Acid Amide | 0.11 | 0.11 | 0.11 | 0.11 | 0.11 | 0.11 | 0.11 | 0.11 |
| Polyether modified Hydroxy Dimethylpolysiloxane | | | 0.52 | | 0.21 | | | |
| Polyester modified Hydroxy Dimethylpolysiloxane | | | | 0.52 | | 0.21 | | |
| Polyether-Polyester modified Hydroxy DMPS | | | | | | | 0.44 | 0.44 |
| n-Methyl Pyrrolidone | 0.54 | 0.54 | 0.54 | 0.54 | 0.54 | 0.54 | 0.54 | 0.54 |
| Oxo-Hexyl Acetate | 3.58 | 4.08 | 3.16 | 3.16 | 3.18 | 3.18 | 3.11 | 3.23 |
| | 100.00 | 100.00 | 100.00 | 100.00 | 100.00 | 100.00 | 100.00 | 100.00 |

Low Bake Repair

A silver basecoat composition containing a hydroxyl functional acrylic resin crosslinked with melamine and commercially available from BASF Corporation as E87AE720 was coated onto a primed steel panel as the basecoat of a basecoat/clearcoat composite coating at a thickness at about 1.0 mil. Clearcoat was subsequently applied at varying thicknesses of 0 to 2.0 mils. The panels were partially cured wet on wet at a metal temperature of 124° C. for 15 minutes. A second basecoat layer of 1.0 mil and a second clearcoat layer of 2.0 mils were applied and baked for 15 minutes at 124° C.

The panels were then subjected to an adhesion test as described in ASTM 3359 involving scribing a portion of the The panels were coated as described in the Low Bake Repair test and cured as follows. The first base/clear coat was cured simultaneously for 90 minutes at 146° C. and the second base/clear coat was cured simultaneously for 15 minutes at 124° C. The panels were evaluated for adhesion as described above.

The results are described in Table I below:

| PERCENT ADHESION | | | | | | | | |
|---|---|---|---|---|---|---|---|---|
| Silver Metallic High Solids Basecoat | | | | | | | | |
| Low Bake Repair | 10 | 15 | 100 | 100 | 100 | 100 | 25 | 20 |
| Overbake Repair | 85 | 70 | 95 | 100 | 60 | 100 | 10 | 25 |
| Biege Metallic Water Base Basecoat | | | | | | | | |
| Low Bake Repair | 50 | 45 | 100 | 100 | 100 | 100 | 45 | 40 |
| Overbake Repair | 100 | 95 | 90 | 100 | 90 | 100 | 55 | 35 |
| White Water Base Basecoat | | | | | | | | |
| Low Bake Repair | 40 | 25 | 100 | 100 | 100 | 100 | 35 | 35 |
| Overbake Repair | 95 | 95 | 85 | 100 | 80 | 100 | 25 | 20 |

The invention has been described in detail with reference to preferred embodiments thereof. It should be understood, however, that variations and modifications can be made within the spirit and scope of the invention.

What is claimed is:

1. A curable coating composition comprising
   (A) at least one polymer comprising a plurality of carbamate groups,
   (B) a component comprising a plurality of groups that are reactive with the carbamate groups on component (A), and
   (C) a hydroxy functional polyether or polyester modified polysiloxane component having a hydroxyl functionality, wherein the hydroxyl value is between 50 and 170.

2. A curable coating composition according to claim 1 wherein component (c) comprises a polyester modified polysiloxane.

3. A curable coating composition according to claim 1 wherein the polyester modified polysiloxane component has a weight average molecular weight of between 200 and 3000.

4. A curable coating composition according to claim 1 further comprising a carbamate functional material having a weight average molecular weight between 75 and 2000.

5. A curable coating composition according to claim 1 further comprising a component containing one or more epoxide groups, and which is substantially free of groups that are reactive with components (A) and (B).

6. A curable coating composition according to claim 5 wherein the epoxide containing component comprises epoxide groups derived from glycidyl methacrylate, glycidyl acrylate, allyl glycidyl ether, cyclohexyl monoepoxy methacrylate, the epoxide of the dimer of cyclopentadiene methacrylate, and epoxidized butadiene.

7. A curable coating composition according to claim 1 or 4 further comprising hydroxy functional resin.

8. A curable coating composition according to claim 1 wherein component (B) is an aminoplast resin.

9. A curable coating composition according to claim 1 wherein component (B) is a melamine formaldehyde resin.

10. A curable coating composition according to claim 1 wherein component (A) is a carbamate-functional acrylic resin.

* * * * *